Patented Jan. 6, 1942

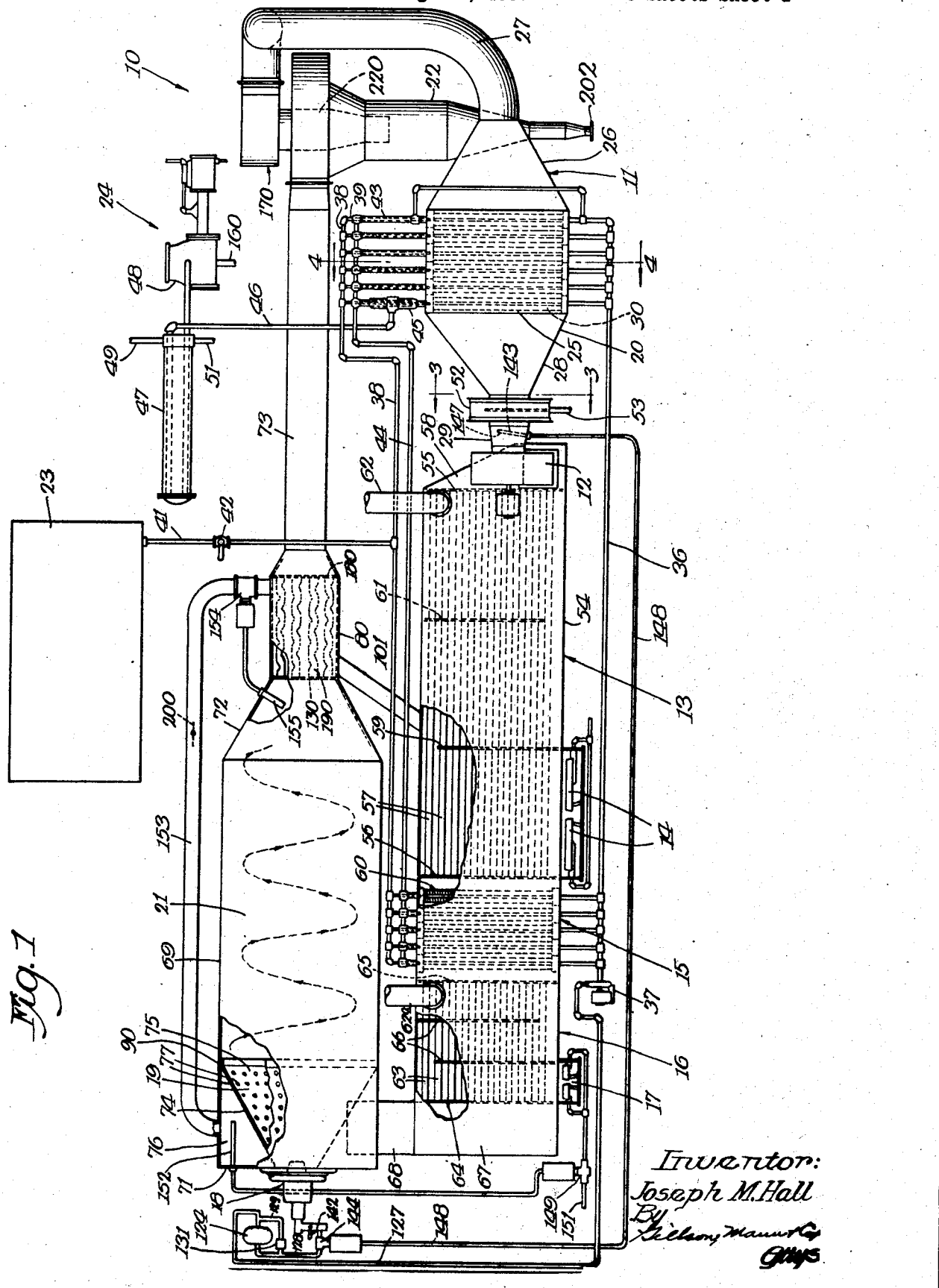

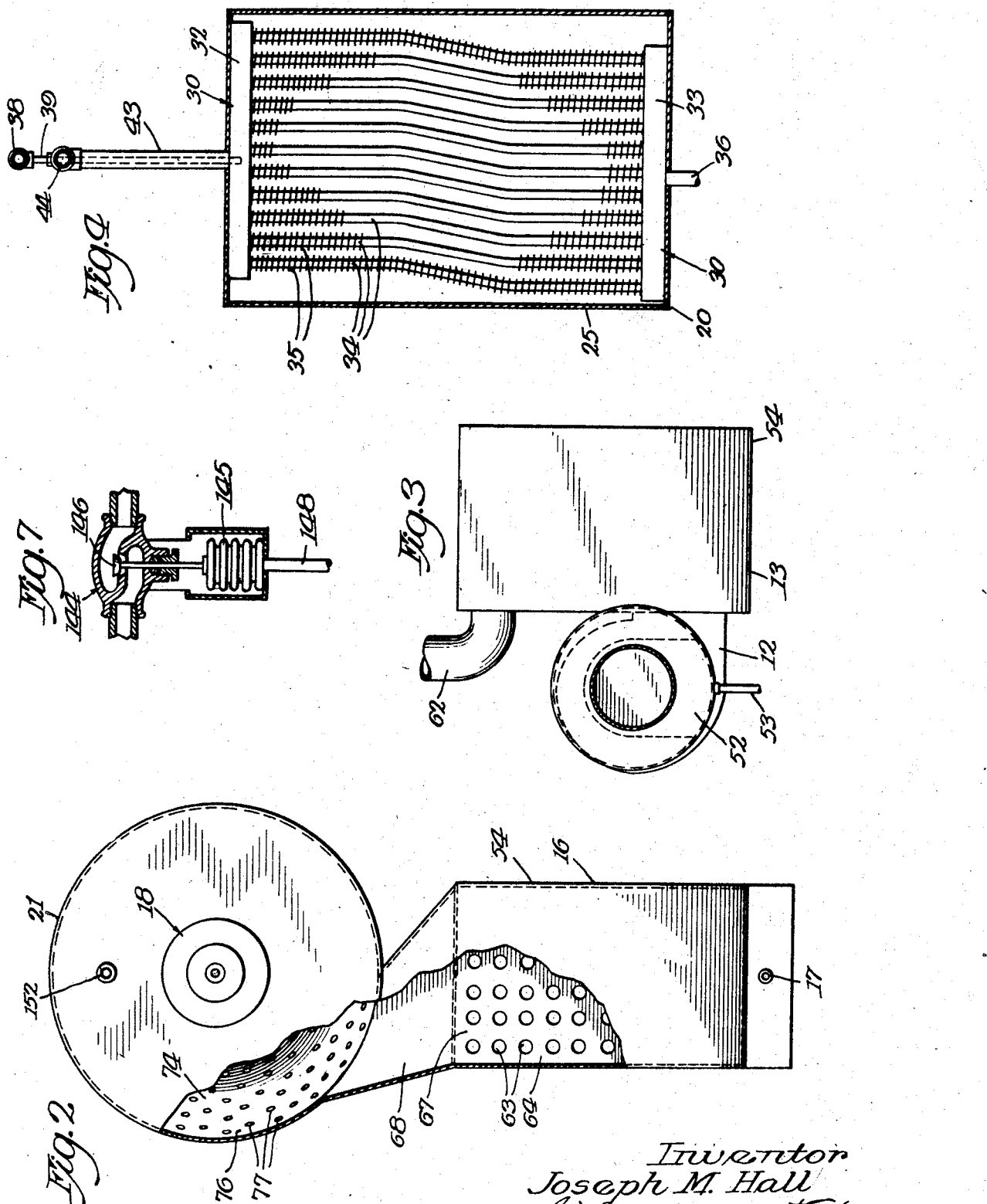

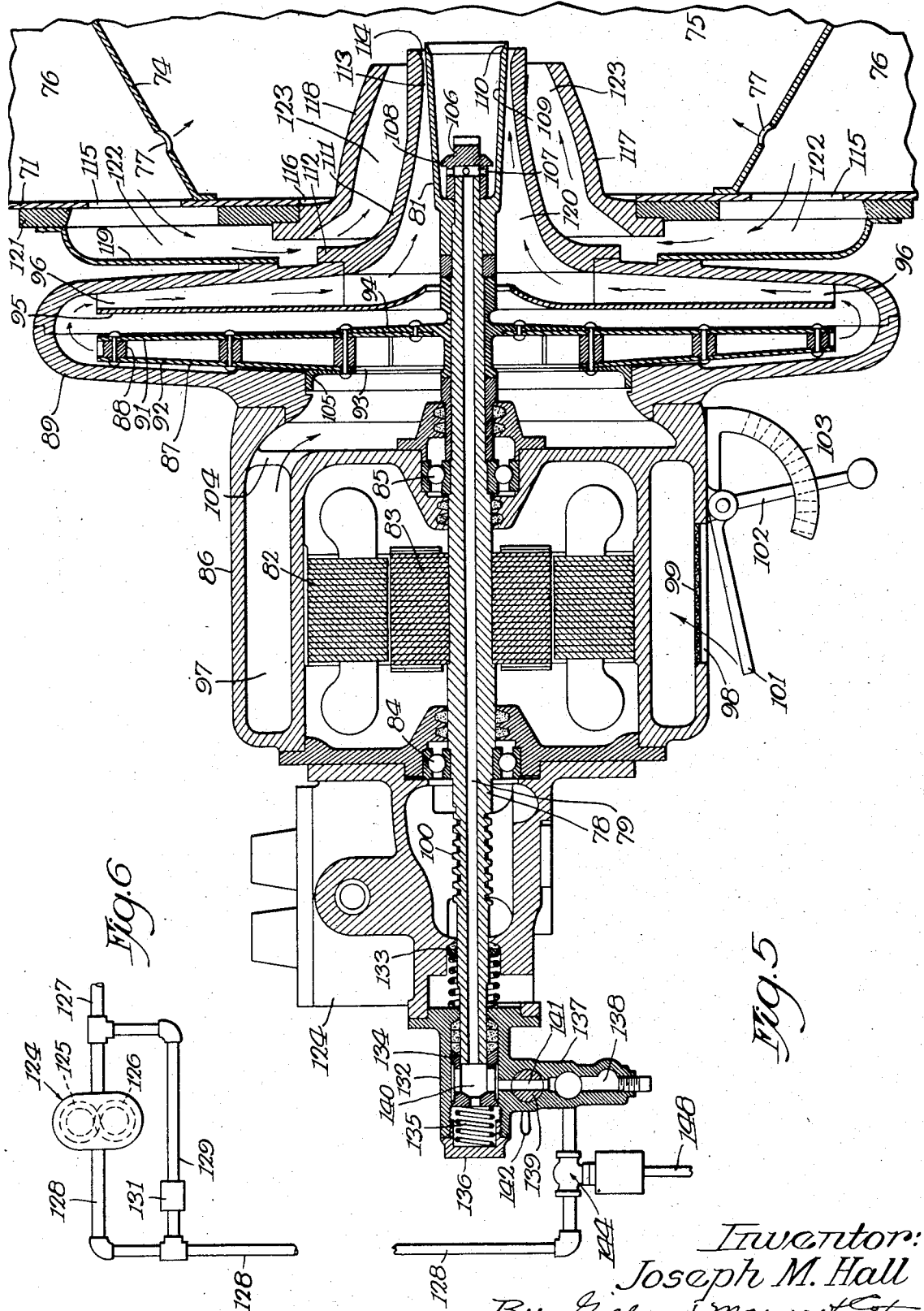

2,268,871

UNITED STATES PATENT OFFICE 2,268,871

APPARATUS FOR EVAPORATING MILK AND OTHER LIQUID PRODUCTS

Joseph M. Hall, Chicago, Ill.

Application August 27, 1937, Serial No. 161,224

10 Claims. (Cl. 159—4)

This invention relates to apparatus for removing moisture from liquid products.

One of the objects of the invention is the provision of a new and improved method of removing moisture from liquid products in such manner as not to unfavorably affect the characteristics of the product.

A further object of the invention is the provision of a new and improved apparatus for removing moisture from liquid products by mechanism employing heated air and recirculating the air in a closed system.

A still further object of the invention is the provision of a new and improved apparatus for evaporating milk and other liquid products by preheating the liquid product and simultaneously subjecting the same to a partial vacuum prior to its evaporation.

Another object of the invention is the provision of a new and improved apparatus for evaporating or desiccating milk and other products, together with novel means for evaporating particles of the product that may have escaped the main evaporating chamber.

Another object of the invention is the provision of a new and improved apparatus for desiccating liquid products by preheating the product under a partial vacuum prior to its evaporation in the main evaporating chamber, together with novel means for substantially instantaneously atomizing and vaporizing the concentrated liquid product.

A further object of the invention is the provision of a new and improved apparatus for evaporating liquid product in a continuous operation that is simple in construction, efficient in operation, that is easily assembled, and that is composed of comparatively few operating parts.

Other and further objects and advantages of the invention will appear from the following description, taken in connection with the accompanying drawings, in which Fig. 1 is a diagrammatic view of the apparatus, showing parts in section and parts broken away;

Fig. 2 is a front end view of the apparatus, with parts removed for the sake of clearness;

Fig. 3 is a section on the line 3—3 of Fig. 1;

Fig. 4 is a section on the line 4—4 of Fig. 1;

Fig. 5 is a longitudinal section of the atomizer and pump mechanism;

Fig. 6 is a diagrammatic view of the pump arrangement; and

Fig. 7 is a diagrammatic view of one of the control devices diagrammatically shown.

Referring now to the drawings, the reference character 10 designates the apparatus generally, which comprises an auxiliary boiler or heat exchanger 11 for removing moisture from the recirculated air and incidentally pretreating the liquid to be evaporated, a blower 12 for causing the circulation of air through the apparatus, a superheater 13 having the burners 14 for materially increasing the temperature of the air flowing therethrough, a main boiler or main heat exchanger 15 for concentrating the liquid, a heater 16 having a burner 17 for increasing the temperature of the air flowing into the evaporator, an atomizer 18 for reducing the liquid to finely divided particles, a mixing chamber 19, an evaporator or dehydrator 21 for removing moisture from the liquid product, and an air separator 22 for separating the desiccated product from the air. There are other important elements, such as the reservoir or liquid container 23 for containing the liquid to be desiccated or evaporated, and a vacuum pump 24 for reducing the pressure on the liquid product while it is being concentrated, as will presently appear.

In desiccating milk and other products it has been found that the cost of operation may be greatly reduced by employing a system that comprises recirculating the heat exchange medium by lowering its temperature, after it has passed through the system, and utilizing the excess heat and the latent heat of the moisture therein for concentrating the liquid preparatory to its atomization and evaporation or desiccation. In this preliminary treatment the milk or other liquid product is subjected to a partial vacuum simultaneously with the utilization of this heat in a continuous operation. Any suitable mechanism may be employed for this purpose.

In recirculating the air for use in evaporating the moisture from the liquid particles it is necessary to first reduce the moisture content of the air before it can be reused in the evaporator. In order to reduce the moisture content of this air the temperature of the air is reduced below the saturation point so as to reduce its capacity for holding moisture. In the present invention the lowering of the temperature of the air is accomplished by using the heated air fresh from the separator for heating the liquid in the boiler 11. For instance, the air comes from the separator, say, at around 220° F. and leaves the boiler 11 at around 150°, thus having its temperature reduced or lowered 70°. With the drop in temperature the relative humidity of the air increases, that is, its capacity for holding moisture decreases to such an extent that more and more water vapor in the air is condensed, and the latent heat contained in this vapor that is condensed is made sensible for heating the liquid in the boiler. The pressure on the liquid in the boiler is partially removed, and hence its boiling point is considerably lowered.

The vacuum in the boiler is preferably maintained at a point, for example, where milk will boil, at approximately 125° F., if milk be the liquid treated. The vacuum for other liquids will vary. The amount of heat units thus transferred from the hot air to the milk will evaporate a considerable amount of moisture from the milk.

In order to make it more easily understood in regard to the drop in temperature of the air, and the corresponding loss of moisture, which occurs in the boiler, suppose air at 75° F. be compared with air at 165° F., as examples. One pound of dry air at 75° F. plus vapor to saturate has a volume of 13.88 cu. ft. The heat units contained in the air are 18.11 B. t. u. Heat units in the vapor are 19.71 B. t. u. Total heat units in one pound of dry air at 75° F. with vapor to saturate are 37.81 B. t. u. Now if this air is heated to 165°, one pound of dry air plus vapor to saturate has a volume of 24.75 cu. ft. The heat units contained in the air are 39.91 B. t. u. Heat units in the vapor are 357.75 B. t. u. Total heat units in one pound of dry air with vapor to saturate are 397.7 B. t. u. In the above cases the heat contents given are B. t. u.'s above zero degrees F. The above figures give the air fully saturated at the two different temperatures.

At 75° temperature one pound of dry air fully saturated will contain 131.4 grains of water. At 165° one pound of dry air fully saturated will contain 2504 grains of water. From the above it can be seen that as the temperature of air is increased its capacity to carry water is rapidly increased, and vice versa, and that after a certain amount of cooling of the water a point can be reached where the air is over-saturated with moisture. When this occurs the moisture in the saturated air is converted from steam to water, and either drops out of the air as water or can be carried along as free moisture mixed in the air. Also, if air containing any amount of moisture, no matter how small, is cooled to a low enough temperature, the steam will be condensed and can be separated from the air in the form of water. As long as the air does not carry sufficient water in the form of steam to be above the saturation point, the water is mixed with the air and forms steam and cannot be separated. When air is saturated 100% it is determined as being humidified 100%. The air may be humidified with any percent of moisture up to full saturation point. If the air is not fully saturated or fully humidified, it has an affinity for water, and if given time enough will absorb water to a saturation point if water is available, and allowed to contact the air.

In this system of evaporation advantage is taken of partly humidified air, applying heat units to the air which raises its temperature. Then using the B. t. u.'s applied to the air to raise it in temperature for the evaporation of water to as near saturation point as possible, and, by cooling the air by passing it through a boiler for bringing the air to a temperature below the saturation point, this air is then reheated and recirculated through the evaporator. While it is being saturated a certain amount of water is evaporated, and when the air is cooled the heat drawn off from the air is used to evaporate more water in the boiler. By this method it is possible to evaporate water in two stages with the same B. t. u.'s. The B. t. u.'s not used are returned to the system; also the discharge air pressure is discharged back into the system and merely boosted in pressure by the fan to cover friction losses through the system.

Any suitable boiler may be used for lowering the temperature of the air to be recirculated.

In the form of the device selected to illustrate one embodiment of the invention, the boiler or heat exchanger 11 is employed for this purpose, which boiler or heat exchanger comprises a casing 20, provided with an enlarged body portion 25, having a tapered portion 26 at one end to which the conduit 27 from the separator 22 is attached. The body portion 25 has a tapered portion 28 at what, for convenience of description, will be termed its front end, to which a conduit 29 for constituting the intake of the blower 12 is attached. The air from the separator 22 is adapted to pass through this casing, and through a water eliminator of any suitable construction, on its path to the blower 12.

The boiler unit 30, Fig. 4, is mounted within the body portion 25 of the casing 20. This unit comprises an upper header 32 and a lower header 33, which are connected together by tubes 34 which form a rigid structure within the casing 20. These tubes have their ends secured in the headers 32 and 33 and each of them preferably has one end portion offset from the other which permits contraction and expansion of the tubes without becoming detached from the headers 32 and 33. In order to increase the heat conducting surfaces of these tubes, they may be provided with radially extending fins 35. These tubes and headers are adapted to contain the liquid product that is being treated. The heated air from the separator passes among the tubes 34 within the casing 20, and imparts its heat to the fins and tubes, which in turn heat the liquid product contained therein.

The header 33 is connected to a suitable main 36, which in turn is connected to a centrifugal pump 37 and to the tubes of the heater 15. The upper header 32 is connected to a supply pipe 38, as by means of branch conduits 39. The pipe 38 is connected to the reservoir or container 23, as by means of the pipe 41. If desired, a valve 42 may be provided in the pipe 41 for controlling the amount of liquid product supplied to the boilers 11 and 15.

Suitable means are provided for reducing the pressure on the liquid that is being evaporated. As shown, the branch conduits 39 are each surrounded by pipes or jackets 43, each of which is secured at one end in the header 32 and its other end in communication with an exhaust conduit 44. One of the jackets or pipes 43 is provided with a water trap 45, to which a pipe 46, leading to a condenser 47, is attached. The trap prevents liquid from passing to the condenser. The pipe 46 passes through the condenser 47, and is secured to the intake of a vacuum pump 48. The condenser 47 is adapted to be supplied with water through a pipe 49, and is discharged through a pipe 51. The vacuum pump 48 reduces the pressure within the separator unit and also removes moisture in the form of vapor from the liquid product and discharges the same as waste in the form of condensed moisture.

The reduction of the pressure in the headers and connecting pipes greatly reduces the boiling point of the liquid product supplied thereto, and the heated air passing across the pipes 34 will cause the liquid product in said pipes to boil, with the resultant loss of a considerable amount of its moisture.

The passage of the heated air from the collector 22 will have its temperature, which may be around from 200° F. to 220° F., greatly reduced, say, to 150° F., in passing through the boiler 11, due to the absorption of heat by the liquid and the heat rendered latent in the vapor that is removed from the product by the vacuum pump 48. The air from the evaporator is passed through the water separator 52 for removing the free moisture contained therein prior to its entry into the blower 12. Any suitable water separator may be employed. Since the details of this separator constitute no part of the present invention, it is not thought necessary to illustrate or describe the same further than to state that it is provided with one or more baffles, and that the collected moisture is discharged through a drain pipe 53 from the separator.

Preferably, though not necessarily, additional means are provided for assisting in evaporating the liquid product before it is supplied to the evaporator. A superheater 13 and boiler 15 are employed for this purpose. A portion of the liquid product is condensed in this boiler. From the blower 12 the air is discharged into this superheater 13, said superheater comprising a portion of the casing 54. In the form of construction shown the casing 54 is extended forwardly beyond the superheater for containing the heater 16 and auxiliary boiler 15. This arrangement, of course, is a matter of convenience in the construction of the apparatus. The casing 54 is provided with a partition 55 at its rear end, and with a partition 56 at its forward end. The partitions are perforated, and have a plurality of pipes or conduits 57 secured at their ends in these perforations.

The air passing from the boiler 11 into the blower 12 is discharged in a header 58, and from thence it passes through the tubes 57 of the superheater to the space occupied by the main boiler 15.

The temperature of the air is materially increased in the superheater 13. The air may be heated in this superheater to from 500° to 1000° F., preferably to around 750° F., depending on the amount of evaporation desired in the boiler 15. In the form of construction shown the superheater 13 is provided with burners 14 for heating the air as it passes through the tubes 57.

Suitable baffles 59, 61, are provided in that portion of the casing forming the superheater. External air passing over the burners 14 will be caused, by these baffles, to take a zigzag course through the superheater, and, flowing around the tubes 57, is discharged through the pipe 62. The heated air passing through the pipes 57 from the blower 12 will be forced through the boiler 15, and, flowing around the pipes in the boiler unit 60, will impart its heat to the liquid product contained in the boiler unit. This heat will vaporize a portion of the moisture contained in the product, and this will be removed by the vacuum pump 48, as described above.

Since the boiler 15 and the evaporator unit 60 thereof are constructed in substantially the same manner as the corresponding boiler 11 and evaporator unit 30, it is not thought necessary to repeat the description of this boiler or unit any further than to state that the two boilers are connected together in multiple. The boiler 15 may be materially increased in size, if desired, in order to absorb a considerable portion of the heat in the air that is passing through the superheater for evaporating the liquid product still further. The vacuum maintained in this boiler is such that the milk boils at around 125° F., and since it does not rise above this temperature, it will not be injuriously affected by the heat. The high temperature of the air in this boiler simply results in the more rapid evaporation of the moisture content of the milk.

The air, having its temperature reduced by the absorption of heat in the boiler 15, materially below 350° F., is then passed into the heater 16. This heater is constructed similar to the superheater 13 and has tubes 63 secured in perforations in the partitions 64, 65, through which the air now passes on its path to the evaporator. This air is reheated and delivered to the evaporator. Reheating the air to around 350° F. has been found to give excellent results.

The heater 16 may be provided with one or more baffles 66, so as to cause the external air passing over the burner 17 to take a zig-zag course through the heater for heating the air passing therethrough from the blower 12. The air is discharged through the pipe 62a. The forward end of the casing 54 is spaced from the partition 64 to form a header 67, which is in communication with the evaporator 21 through a conduit 68, which delivers the air into the evaporator casing tangentially, as is most clearly shown in Fig. 2.

The evaporator 21 is preferably cylindrical in form and elongated to give the particles ample time to become compacted and glazed on their surfaces. It comprises a casing 69, having an end wall 71 at its front end and a tapered portion 72 at its rear end. The tapered portion 72 is connected to an auxiliary heater or liquid eliminator 80, which in turn is connected to a conduit 73 which connects the evaporator 21 with the separator 22. A cone-shaped perforated member 74, having its vertex secured to the end wall 71 for closing the rear end of the atomizer 18, has its forward end engaging and secured to the casing wall 69, as shown at 90. The cone-shaped member 74 forms an atomizing chamber 75, into which the finely divided particles of the liquid product are discharged, as will presently appear.

The space defined by the rear end wall of the casing 69 and the cone-shaped member 74 forms what, for convenience of description, will be termed a pressure chamber 76. The tapered wall of the member 74 is provided with a plurality of perforations 77, through which air under pressure in the chamber 76 is adapted to be projected into the atomizing chamber 75. Heated air from the chamber 67 is conducted tangentially through the conduit 68 into the pressure chamber 76. During the operation of the device this air will pass through the openings 77 and will continue in its spiral movement within the atomizing chamber, and on through the evaporator, in a spirally moving stream.

Appropriate means are provided for atomizing or reducing the liquid product to finely divided particles and for discharging the same spirally into a current of heated air moving spirally in the opposite direction.

In the form of construction selected to illustrate one embodiment of the invention (Fig. 5) a shaft 78, having an axial opening 79 for conducting the liquid product to an atomizing cone or hood 81, is employed for this purpose. The shaft 78 is operated by a suitable motor 82, as by being rigidly connected to the rotor 83 of said motor. The shaft 78 is mounted in suitable antifriction bearings 84, 85, in the motor case 86.

A suitable fan or blower 87, of the centrifugal type, having conventional curved blades 88, is attached to and rotates with the shaft 78. The fan or blower 87 is mounted in a casing 89, which may be, and preferably is, rigidly connected to the motor casing 86, as is clearly shown in Fig. 5 of the drawings. The fan or blower 87 may be of any suitable or conventional type, and comprises a rear disk member 91 and a forward disk member 92, between which are arranged curved blades 88 of usual construction. The forward disk 87 has an enlarged axial opening 93, which constitutes the intake of the fan or blower. The rear disk 91 is connected to an annular flange 94, integral or rigid with the hub of the fan, and causes the air to move outwardly and be discharged at the periphery of the disks.

A suitable partition 95 surrounds the shaft 78 rearwardly of the fan, and is spaced from the rear wall of the fan casing 89 to form conduits 96 for conducting the air discharged by the fan radially inwardly and then rearwardly, as will presently appear.

The motor case 86 is surrounded by an air conduit 97, which has an exterior opening at 98 through which exterior air enters during the operation of the fan. This air cools the motor and in turn is warmed by the heat generated in the motor. This warm air is used for atomizing the liquid product, as will presently appear. An air cleaner 99 is mounted in the opening 98 for cleaning the air entering the fan.

A suitable closure 101 is provided for controlling the amount of air admitted to the passage 97. This closure is provided with a bell-crank resilient arm 102, which is adapted to engage notches on a quadrant 103 for holding the closure 101 in adjusted position.

The casing 86 is provided at the side opposite the closure 98 with one or more openings 104 for admitting the air entering the conduit 97 into the intake 93 of the fan, which fan is provided with an annular hub 105 extending into an opening in the fan casing for providing a substantially airtight joint.

The rearward end of the hollow shaft 78 is provided with a cap 106, having radial openings 107 through which the liquid product is discharged. The cap is provided with an annular flange 108, which extends radially outward beyond the openings 107 at the rear thereof for directing the liquid product radially outwardly during the operation of the machine.

Attached to the rear end of the shaft 78, and extending about and rearwardly beyond the cap member 106, is an atomizing cone or hood 109. This cone is hollow at its outer end, and the walls are tapered and diverge rearwardly. The cap 106 is located within the hollow portion, and during the operation of the device the cone 81 rotates with the cap 106, and the centrifugal force of the liquid discharged through the openings 107 onto the interior of the hood 81 forms a film that gradually moves outwardly and is discharged from the outer ends of the hood into the moving air in a radial direction, as will presently be described.

The inner surface of the rear end of the cone 109 is beveled, as at 110, for accentuating the discharge of the liquid film when it reaches this point in moving along the inner surface of the cone 81. In other words, when the particles reach this beveled surface they would be abruptly discharged radially outwardly in a spray, due to the rapid increase in the effective force of centrifugal action.

Suitable means are provided for causing the air warmed more or less by its passage around the motor to be discharged at a high velocity along the atomizer cone 81, transversely across the radially moving liquid for atomizing the same as it is discharged from the cone. As shown, an atomizer nozzle 111 is employed for this purpose. This nozzle is cone-shaped and has its base 112, at its forward end, radially extended and rigidly connected to the inner portion of the fan casing 89, as shown more particularly in Fig. 5 of the drawings. The nozzle 111 is hollow and extends about the atomizer cone 109, and is spaced slightly therefrom to form an annular air passage 120, having an annular restricted portion, as at 113, for increasing the velocity of the air passing through the annular opening. A comparatively small amount of air, but at high velocity, is discharged through this restricted opening 113. The size of the atomized particles will vary somewhat inversely as the velocity of the air. With increase in speed of the fan and of the velocity of the air, the particles discharged from the nozzle will be finer, and vice versa.

The rear inner surface of the nozzle 111 may be beveled, as shown at 114, for somewhat spreading the air stream as it emerges into the atomizing zone.

The air from the fan 87 will be discharged through the narrow annular opening 113 preferably at a velocity much higher than the air entering the evaporator through the passage 68, and this high velocity air, coming in contact with the liquid particles discharged from the cone 109, and which particles will be moving at substantially right angles to the air stream and rotating counter to the direction of the air entering the evaporator through the passage 68, will break the liquid particles up into much finer particles. These liquid particles will continue to rotate and the air current flowing across the same will cause these particles to take the form of a rotating hollow cone, which is being discharged into the center of the whirling heated air, as will presently appear.

The partition wall 71 (Figs. 1 and 5) is provided with a plurality of openings 115, extending about the forward end of the cone-shaped member 74 but radially outward thereof. The partition 71 is also provided with an enlarged axial opening 116, within which is mounted a tapered hollow member or auxiliary nozzle 117. This nozzle has its base rigidly attached to the partition 71 and extends rearwardly therefrom. The rearward extension 118 of this member extends about the nozzle member 111 and is spaced therefrom to form an annular air passage 123.

An annular shield member 119 has its outer periphery attached to a reinforcing element 121, which in turn is secured to the end member 71 of the evaporator. The inner peripheral edge of the inner member is secured to the rear portion of the fan casing 89, thus forming a passage 122 through which air from the pressure chamber 76 may pass into the space 123 and be discharged at comparatively high velocity rearwardly and along the rear end of the cone-shaped member or nozzle 111. The heated air from the chamber 76 will pass along the passage 123 and be discharged at high velocity, due not only to the high pressure in the chamber 76 but also to the fact that the discharge of the air and liquid from the end of the nozzle and cone creates a partial vacuum in the atomizing chamber 75. This air, moving through the passage 123, will enter the chamber 75 whirling around in the same direction as the air in the evaporator, but in a direction opposite to the shaft 78, and consequently counter to the rotation of the liquid particles discharged from the nozzle, with the result that this heated air is instantaneously thoroughly mixed with the atomized liquid particles.

It will thus be seen that the air passing through the passage 123, which comes from the pressure chamber 76, is at high temperature, and when it comes in contact with the finely divided particles of the liquid product it will tend to instantaneously evaporate more or less of the moisture contained in these particles and project the same into the central portion of the spirally moving heated air admitted through the openings 77, where the evaporation is completed. Due to the direction in which the cone 109 is rotating, these particles will be rotating in a direction counter to that of the air admitted through the openings 77, thus insuring a thorough mixing of the heated air and liquid particles, with a consequent approximately instantaneous evaporation of the moisture contained within these particles.

The air enters the evaporator at, say, around 350° F., but the temperature is lowered to, say, around 200° F. to 220° F. by the instantaneous evaporation of the moisture in the particles. Since evaporation is a cooling process this instantaneous evaporation of the moisture prevents the particles from becoming heated sufficiently high as to injuriously affect the characteristic properties of the liquid product. The continued rotation of the air through the evaporating chamber 21 will tend to compact these minute particles into pellet-like particles and form a glaze about the same.

If desired, a water eliminator 80 may be provided for evaporating any moisture contained in any of the particles after passing through the evaporator. This device may also be employed to insure against the temperature of the air falling too near its saturation point. This eliminator may be built into the rear end of the evaporator, and comprises a front wall 130, a rear wall 180, and a plurality of pipes 190 connected in openings in the walls. The pipes are crooked so that the air passing from the evaporator to the passage 73 is caused to take a zigzag course, whereby the solid particles of the liquid product will come in contact with the pipe walls in passing therethrough. The mixture will change its direction of flow as it passes into the tubes, and several times within the tubes, and the particles, being heavier, will contact the tubular walls because of their inertia to change of direction.

A shunt conduit 153, having an electrically controlled valve 154 therein controlled by a conventional humidostat 155, located in the air stream in the rear end of the evaporator, is provided for supplying heated air from the pressure chamber 76 to the eliminator when the moisture content of the air rises above a predetermined amount. The valve 154 may be controlled by a thermostat, if desired, to insure a minimum temperature of the air leaving the evaporator. The conduit may be provided with a hand valve 200 for closing, or partially closing, the conduit, if desired. The air is returned to the evaporator through the conduit 101. If a thermostat be employed, it would be located in this conduit 101.

The means for supplying the milk or other liquid product to the atomizer mechanism will now be described. The liquid is contained in a reservoir or container 23, from which it is supplied to the boilers 12 and 15. The concentrated liquid is moved along the pipe or conduit 36 by the pump 124 and the booster pump 37. The pump 124 may be integral with or rigidly attached to the motor casing 86. For convenience of construction and assembly, it is rigidly attached thereto. The pump may be of any suitable construction. That shown is the gear type of pump comprising the gears 125 and 126 which are shown diagrammatically in Fig. 6. The liquid enters through the pipe 127, and is discharged through the pipe 128, which supplies the condensed liquid to the atomizer under considerable pressure.

The pump 124 operates continuously during the operation of the apparatus and is provided with a bypass shown at 129 in Fig. 6. This bypass is provided with a conventional pressure relief valve 131, which is adapted to operate at a predetermined pressure for bypassing the fluid back to the pump intake when the pressure in the section 129 of the pipe 128 exceeds a predetermined amount. This bypass is built in the pump casing but is shown diagrammatically in Figs. 1 and 6.

A hollow casting 132, Fig. 1, is attached to the pump casing, and then extends about the forward end of the shaft 78. The front end of the shaft 78 extends through a spring-pressed gland 133, and also a gland 134, which is held compressed by a spring 135, which takes a bearing against a cap 136 in the forward end of the casting 132. This casting is provided with a laterally extending arm or projection 137, which is provided with an axial passage 138 which is in communication with the axial opening 79 of the rotating shaft 78.

A suitable valve 139 is mounted in the passage 138 for controlling the amount of liquid supplied to the chamber 140 in communication with the passage or axial opening 79. This valve is of the usual construction, having a passage 141 therethrough and is provided with a handle 142 for rotating the same for closing the passage 138, or for restricting the flow of liquid therethrough.

The pump 124 is operated from the shaft 78, Fig. 5, by means of the worm gear 100 on said shaft. Since the details of the pump constitute no part of the present invention it is not thought necessary to further illustrate or describe the same.

In the operation of the apparatus air at comparatively high temperature is employed for evaporating or desiccating the liquid particles projected or sprayed into the air within the evaporating chamber 75. The latent heat of evaporation greatly reduces the temperature of this air, and in order to insure the air being well above its saturation point when it passes through the separator 22 means are provided for controlling the amount of liquid supplied to the atomizer during the operation of the apparatus. Any suitable mechanism may be employed for that purpose.

In the form of device selected to illustrate one embodiment of the invention, a fluid thermostat 143 is employed for controlling a supply valve 144. This thermostat may be secured at various positions along the path of the air passing through the separator 22, but, as shown, it is mounted in the intake of the blower or fan 12. As shown, the valve mechanism 144 comprises a metal bellows 145, Fig. 7, adapted to be operated by fluid pressure for controlling the valve proper 146. The valve stem is connected to the metal bellows 145. The bulb 147 of the thermostat 143 is connected by a tube 148 with the metal bellows, and the tube 147 is adapted to be filled with a highly volatile liquid so that when the temperature of the air flowing over the bulb 147 rises above a predetermined amount it will vaporize more and more of the liquid, creating an increase in pressure in the tube 148 and bellows 145 for opening the valve 146. When the temperature falls below a predetermined amount the metal bellows 145 will automatically contract, thereby closing the valve and shutting off the supply of liquid product to the atomizer.

In the evaporation or desiccation of liquid products it is necessary, in order to preserve the peculiar characteristics of the product, to evaporate the same practically instantaneously at comparatively high temperatures, the temperatures varying with the character of the liquid treated. In desiccating milk, for instance, it is found that a temperature of around 350° F., or from 300° F. to 400° F. gives the best results. In order to insure that the air will be maintained at the required temperature, and not approach too closely its saturation point, suitable means are provided for controlling the heat supplied to the air on its path to the evaporator by the heater 16.

In the form of construction shown this is accomplished by providing means for automatically controlling the supply of fuel to the burners 17. As shown, a valve 149, similar to the valve 144, is provided in the fuel line 151 that supplies fuel to the burner 17. This valve is controlled by a thermostat 152, located in the evaporator. This valve is similar to the thermostat 147 and the description thereof need not be repeated.

During the operation of the device, when the temperature of the air within the pressure chamber 76 falls below a predetermined amount the thermostat 152 will cause the valve 149 to open, thereby supplying additional fuel through the pipe 151 to the burner 17 for increasing the temperature of the air, and, vice versa, when the temperature within the chamber 76 rises above a predetermined amount the thermostat will cause the valve 149 to close, thereby diminishing the supply of fuel to the burner 17.

In the operation of the device air from the separator 22 passing along the conduit 27 will be drawn by the fan through the boiler 11. Assuming that the device has been in operation the air passing through the conduit 27 will heat the boiler unit 25, thereby lowering the temperature of this air, as previously described. In the meantime the vacuum pump 48 will have reduced the pressure on the liquid product contained in the boiler unit and the heated air passing across the unit will cause the liquid to boil, and the evaporated moisture will be drawn by the vacuum pump through the condenser 47, where it is condensed, and will then be discharged from the pump through the discharge pipe 160. The air passing through the boiler 11 will have its temperature, and consequently its moisture content, very greatly reduced, and it will be forced by the fan through the superheater 13, where its temperature is increased prior to its passage through the auxiliary boiler 15 for further evaporating the liquid product.

As the air passes through the boiler 15 it will assist in evaporating the liquid in the manner described with relation to the boiler 12, which evaporation will lower the temperature of the air very greatly. The air at its reduced temperature will pass through the heater 16, where it will be heated to the required temperature and discharged through the passage 68 into the pressure chamber 76.

In the meantime the liquid product that is being evaporated will be pumped from the pipe 36 and forced through the passage 79 outwardly through the radial openings 107 Fig. 6 to the rapidly rotating cone 113. The centrifugal force will cause the fluid to form a film on the inner side of the hood 113, which will travel gradually outward or rearward due to the cone being flared at its rear end, and will be discharged in a spray radially across the air flowing at high velocity through the restricted passage 113, which air will break up the liquid particles into very minute particles. These particles, which are rotating in the direction of the shaft 78, will come in contact with the heated air passing from the pressure chamber 76 through the passage 123, which is rotating in the opposite direction, and also in contact with air from the pressure chamber 76 that passes into the vaporizing chamber 75, and which is also rotating in a direction opposite to that of the particles, with the result that there is a thorough mixing of the particles and air and an instantaneous evaporation of the moisture in the particles. The heated air will carry those particles in a spiral path rearwardly through the cylindrical evaporator 21, compacting them and forming a glazelike surface on each particle.

The mixture of air and particles now passes through the separator 22, where the solid particles are removed from the air. The separator 22 may be of the usual or any well known construction. Since the details of the separator constitute no part of the present invention, it is not thought necessary to further illustrate or describe the same other than to state that the air from he conduit 73 is introduced into the separator casing tangentially and is forced out of the separator casing through a pipe and chamber 160 tangentially into the pipe 27, thus completing the cycle of operation. The desiccated product is collected in the bottom of the separator and is discharged from time to time through the gate or valve 202.

By changing the adjustments and adjusting the thermostat controls, various liquids may be concentrated or desiccated, as desired. When the liquid product is to be concentrated by evaporation, and is not to be desiccated, the separator is replaced by a fluid separator for separating the air from the finished product.

It will thus be seen that with the present apparatus, the only heat loss is that discharged with the moisture evaporated from the liquid product. There is, of course, more or less loss of heat units due to radiation, but in practice the surfaces not intended to radiate heat are covered by suitable insulating material which will reduce this loss by radiation to a minimum.

It is thought from the foregoing taken in connection with the accompanying drawings, that the construction and operation of my device will be apparent to those skilled in the art, and that changes in size, shape, proportion and details of construction may be made without departing from the spirit and scope of the appended claims.

I claim as my invention:

1. In an apparatus for desiccating liquid products comprising mechanism for concentrating said liquid product, means for reducing the concentrate to fine particles, an evaporator, means for delivering heated air under pressure tangentially into one end of said evaporator and for discharging the same mixed with the dried particles through the opposite end of said evaporator, a moisture eliminator through which the mixture passes, means for supplying heated air to said eliminator, and means responsive to the change of relative humidity in the air flowing from said evaporator into said eliminator for controlling the amount of heated air supplied to said eliminator by said last-named means.

2. In a dehydrating apparatus, a pair of boilers in multiple, a heating chamber between said boilers, a dehydrating chamber, means for circulating air through said heating chamber and one of said boilers and for discharging the same in said dehydrating chamber in a rotating stream of air, means for reducing a liquid product to finely divided particles and for projecting the same into said stream of air, means for separating the dehydrated particles from the air, means for conveying said air through the other of said boilers for concentrating the liquid product, a reservoir for the liquid product, and means for conveying said product to said boilers and from said boilers to said dehydrator.

3. In a dehydrating system, a dehydrator chamber for dehydrating particles of a liquid product, means for delivering heated air to said chamber, means for projecting atomized liquid particles into said air within said chamber for dehydrating the same, means for separating the dehydrated product from said air, a boiler through which said air is conducted for concentrating said product, and temperature actuated means controlled by the temperature of the air emerging from said boiler for controlling the amount of the liquid product delivered to said dehydrator chamber.

4. An apparatus for evaporating milk and like liquid products comprising a cylindrical evaporator, means for continuously supplying a stream of heated air tangentially into one end of said evaporator and for causing the same to move spirally through to the opposite end, means for atomizing the liquid product and for projecting the same into said stream of air for evaporating the moisture from the liquid particles, means for shunting a portion of said stream of heated air around said evaporator for heating the stream of air and evaporated particles of said product as the same leaves said evaporator for preventing precipitation of moisture on said particles, means for separating said stream of air from said particles, means for reducing the moisture content of said stream of air by utilizing the same for preheating said product, means for heating said stream of air, and means for delivering the same in heated condition to said evaporator for recirculating the same.

5. In a desiccating device, an evaporating chamber, a perforated conical member in said chamber and forming therewith a pressure chamber, means for discharging heated air into said pressure chamber, means including a hollow shaft for discharging a liquid product in finely divided particles into said first-named chamber, means for rotating said shaft, a head on said shaft discharging into said perforated member, said head having radial openings through which said product is discharged, a distributor member within said conical member rigidly secured on said shaft and rotatable therewith having tapered walls concentric with said shaft and flaring outwardly from its attachment to said shaft for receiving said liquid product in a thin film over the interior of said walls, nozzle means for discharging air across the path of the liquid product particles discharged from said tapered walls, and means for causing the air delivered to said pressure chamber and said first-named chamber to rotate contra to the rotation of said shaft whereby thorough mixing of said air and particles is obtained.

6. In a system for dehydrating liquid products, a dehydrator chamber, a cyclone separator, a heat exchanger, a heater, a second heat exchanger and a second heater in series communication, means for reducing a liquid product to finely divided particles and for projecting the same into said chamber in the form of a spray, means for circulating air through said chamber, separator, heat exchangers and heaters, means for shunting a small portion of said air while in heated condition around the major portion of said chamber, and means for utilizing said small portion of air for heating the mixture of air and dehydrated particles discharged from said chamber just prior to their introduction into said separator.

7. In a system for dehydrating a liquid product, a dehydrating chamber, a cyclone separator, a passage between said chamber and separator, spray mechanism for spraying a liquid product into said chamber, means for discharging heated air under pressure into said chamber across the sprayed particles therein for dehydrating said particles and for conducting the same through said passage to said separator, means for heating said air immediately prior to its discharge into said dehydrator chamber, and means for shunting a portion of the heated air around the main portion of said dehydrating chamber and discharging the same across said passage for raising the temperature of the air and particles passing therethrough just prior to their entry into said separator whereby the temperature of the mixture will remain above the dew point of the air during the separation of said particles therefrom.

8. In combination, an evaporator chamber, an air pressure compartment in said chamber, atomizer mechanism for said chamber, said mechanism comprising a hollow shaft extending into said chamber for conducting liquid product thereto, a head on the rear end of the shaft having radial openings therein of substantially the same diameter and symmetrically arranged about the axis of said head, a member provided with a cone-shaped interior surface flaring toward its free end for receiving the liquid product discharged through said openings, the outer end of the flared portion of said member being beveled outwardly, means for rotating said shaft and member whereby a film of said liquid product flows along the inner conical face of said member and is discharged radially from said baveled edge at high velocity, a nozzle for discharging air along the exterior of said member, a second nozzle surrounding said first named nozzle, and conduits for conducting air under pressure from said chamber to said second nozzle for assisting in removing moisture from said product, said last-named air rotating in a direction counter to the rotation of said shaft.

9. A system for dehydrating liquid products comprising a pair of boilers, a heater between said boilers, a dehydrator, a separator, means for causing air to be recirculated through said heater, dehydrator, separator, one of said boilers, said heater and the other of said boilers in series, means including a conduit for continuously adding fresh air to the system, means for continuously discharging a small amount of the air in said system into the atmosphere, means for utilizing said last-named air immediately prior to its discharge into the atmosphere for preheating the main body of air prior to its introduction into said dehydrator, means for circulating a liquid product through said boilers in parallel, and means for projecting finely divided particles of said product into said dehydrator.

10. An apparatus for evaporating a liquid product comprising a dehydrator chamber, means for discharging heated air into one end of said chamber and for causing said air to move in a spiral path through said chamber from said end to the other, means for discharging liquid product particles into the spirally moving air within said chamber at said first named end, said particles being carried along by said air, means including a collector for collecting the dehydrated particles of said product from said air after the air and particles pass from said chamber, means comprising a boiler for removing moisture from a major portion of air discharged from the collector, a heater and a second boiler receiving air from said first boiler, means conducting air from said second boiler to said dehydrator chamber, and means for conducting said liquid product through said boilers in parallel and thence to said dehydrator chamber.

JOSEPH M. HALL.